United States Patent
Peterson et al.

(10) Patent No.: US 7,366,380 B1
(45) Date of Patent: Apr. 29, 2008

(54) PLC FOR CONNECTING OPTICAL FIBERS TO OPTICAL OR OPTOELECTRONIC DEVICES

(75) Inventors: Mark Peterson, San Diego, CA (US); Mark Harrison, Escondido, CA (US)

(73) Assignee: Luxtera, Inc., Carlsbad, CA (US)

( * ) Notice: Subject to any disclaimer, the term of this patent is extended or adjusted under 35 U.S.C. 154(b) by 236 days.

(21) Appl. No.: 11/109,210

(22) Filed: Apr. 18, 2005

(51) Int. Cl.
*G02B 6/26* (2006.01)
*G02B 6/42* (2006.01)

(52) U.S. Cl. .................................................. 385/47
(58) Field of Classification Search ............... 385/47
See application file for complete search history.

(56) References Cited

U.S. PATENT DOCUMENTS

| | | | | |
|---|---|---|---|---|
| 5,724,464 A | * | 3/1998 | Kozuka | 385/31 |
| 5,894,535 A | * | 4/1999 | Lemoff et al. | 385/47 |
| 6,027,255 A | * | 2/2000 | Joo et al. | 385/88 |
| 7,118,293 B2 | * | 10/2006 | Nagasaka et al. | 385/89 |
| 2004/0136660 A1 | * | 7/2004 | Cheng et al. | 385/88 |
| 2004/0234205 A1 | * | 11/2004 | Shimada et al. | 385/50 |

OTHER PUBLICATIONS

Hartman, et al., An Effective Lateral Fiber-Optic Electronic Coupling and Packaging Technique Suitable for VHSIC Applications. Journal of Lightwave Technology, vol. LT-4, No. 1, Jan. 1986, pp. 73-82.

Tocci, et al., Optical Interconnection (Boston, Artech House, 1994), pp. 244-252.

* cited by examiner

*Primary Examiner*—Frank G. Font
*Assistant Examiner*—Mary A El Shammaa
(74) *Attorney, Agent, or Firm*—Fernandez & Associates, LLP

(57) ABSTRACT

Planar lightwave circuit (PLC) connects optical fibers to the top of an optical or optoelectronic device or optical or optoelectronic integrated circuit. Light propagating through optical fibers is directed to optical waveguides disposed on optical devices. The optical fibers can be in the form of individual fibers, a fiber ribbon or a fiber array. Fiber optic cables can be plugged into a ferrule attached to the PLC. The PLC can also include optical components integrated into the optical path between the optical fibers and the optical device.

43 Claims, 7 Drawing Sheets

US 7,366,380 B1

PLC FOR CONNECTING OPTICAL FIBERS TO OPTICAL OR OPTOELECTRONIC DEVICES

FIELD OF THE INVENTION

The present invention relates to a planar lightwave circuit (PLC) for connecting optical fibers to the top of an optical or optoelectronic device or optical or optoelectronic integrated circuit and providing a low loss optical coupling between the fibers and the device or integrated circuit.

BACKGROUND OF THE INVENTION

Optical fibers have been widely used for the propagation of optical signals, especially to provide high speed communications links. Optical links using fiber optics have many advantages compared to electrical links: very large potential bandwidth, high noise immunity, reduced power dissipation and minimal crosstalk.

Recent advances in the fabrication of silicon based optical and optoelectronic integrated circuits have resulted in the making of optical waveguides with submicron cross sectional dimensions. Fiber optic cables have typically been edge connected to the sides of optical and optoelectronic integrated circuits, but this method is not readily useable for connecting to submicron waveguides, because of the large mismatch in cross sectional dimensions between a typical SMF fiber core and a submicron waveguide. There have also been recent advances in the design and production of grating couplers to connect to submicron waveguides, which means that optical fibers could be connected to the top of an optical integrated circuit, if a suitable connector were available.

SUMMARY OF THE INVENTION

Planar lightwave circuit (PLC) connects optical fibers to the top of an optical or optoelectronic device or optical or optoelectronic integrated circuit. Light propagating through optical fibers is directed to optical waveguides disposed on optical devices. The optical fibers can be in the form of individual fibers, a fiber ribbon or a fiber array. Fiber optic cables can be plugged into a ferrule attached to the PLC. The PLC can also include optical components integrated into the optical path between the optical fibers and the optical device.

DETAILED DESCRIPTION

Figure 1:
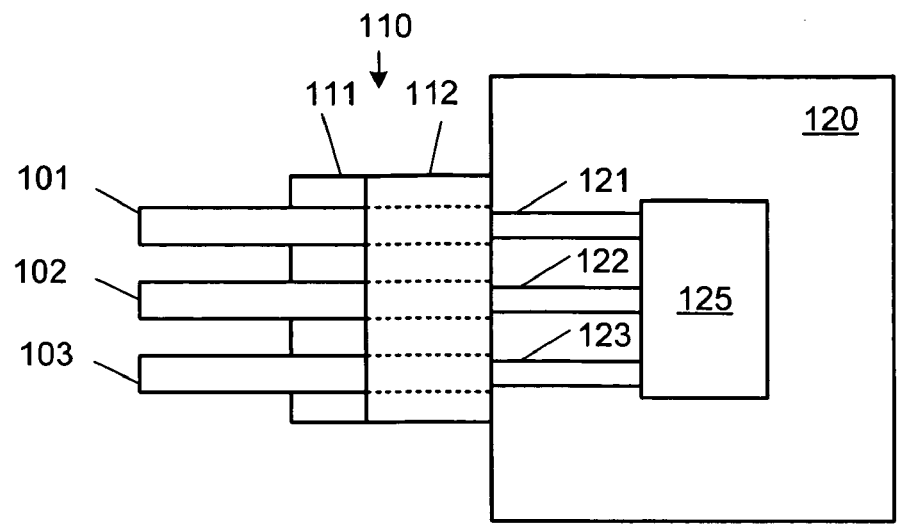
FIG. 1 is a top view of a prior art fiber array used to connect optical fibers to the side of an optical integrated circuit.

FIG. 1 is a top view, not to scale, of a prior art fiber array 110 used to connect a plurality of optical fibers 101, 102 and 103 to the side of an optical integrated circuit 120. Fiber array 110 connects fiber optic cables 101, 102 and 103 to the planar optical waveguides 121, 122 and 123 of optical integrated circuit 120. Waveguides 121, 122 and 123 of integrated circuit 120 are connected to optical device 125 on integrated circuit 120. Fiber array 110 includes pedestal 111 and cover 112. Pedestal 111 typically has a series of v-grooves, which hold optical fibers 101, 102 and 103 so that the fibers can be connected to the side of integrated circuit 120. The v-grooves on pedestal 111 are spaced apart from each other, typically in an equi-distant manner, to match the spacing between the waveguides on integrated circuit 120. Cover 112 holds the fibers in position and can be glued or mechanically attached to pedestal 111.

Connecting optical fibers 101, 102 and 103 directly to the side or edge of integrated circuit 120 can be accomplished if the optical fibers and waveguides are compatible in terms of physical and/or optical characteristics, such as (but not limited to) spacing, cross sectional areas and polarization characteristics. Various types of fibers, such as SMF, PMF or MMF, can be coupled to integrated circuit 120 using fiber array 110.

Fiber array 110 is not a practical solution for the edge coupling of optical fibers to integrated waveguides on integrated circuits if there is a large difference in cross sectional dimensions of the optical modes. Fiber array 110 cannot efficiently connect the typical SMF fiber core to the submicron core of a waveguide constructed on silicon or SOI. Fiber array 110 is also not useable if an optical fiber is to be connected to the top of an optical or optoelectronic integrated circuit while the fibers are horizontal, which is preferred in many practical mounting conditions.

Figure 2:
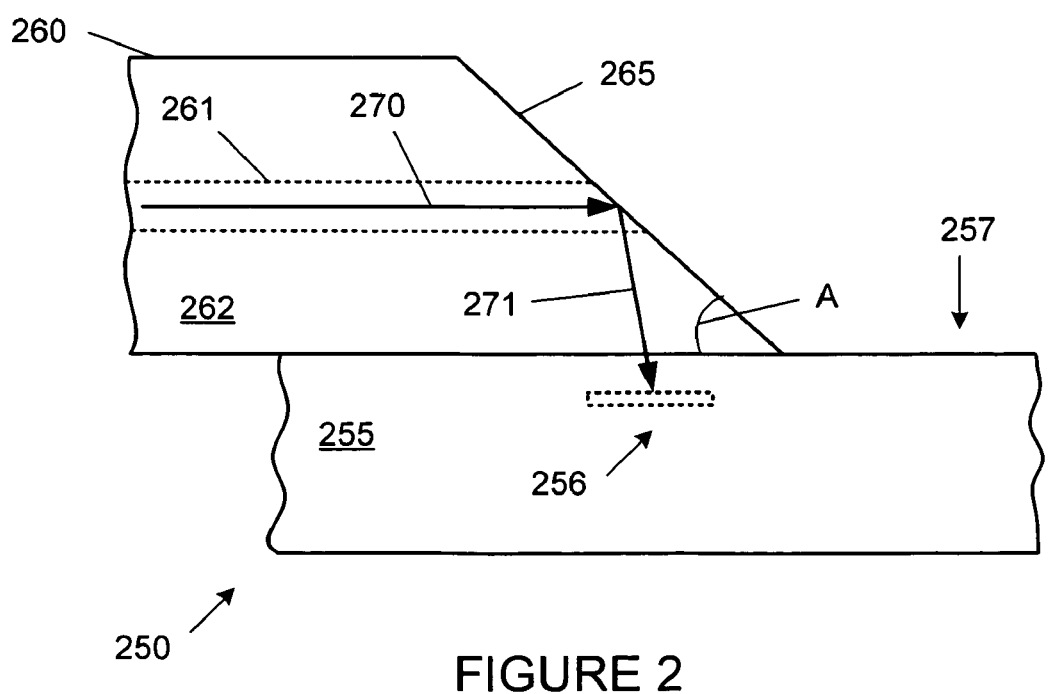
FIG. 2 is a side view of a prior art fiber to chip coupler.

FIG. 2 is a side view, not to scale, of prior art fiber to chip coupler 250. Fiber to chip coupler 250 is made of optical fiber 260 positioned on the surface 257 of integrated circuit (chip) 255. Optical fiber 260 is made of core 261 and cladding 262. Fiber 260 has been cut at angle A with respect to the core 261, which has formed flat surface 265. Angle A can be at 45 degrees, but if angle A is slightly more or less than 45 degrees, than an angle other than 45 degrees minimizes reflections back to angled surface 265 from the surface 257 of chip 255. Light 270 propagating down core 261 will reflect off of surface 265 and propagate as light 271 down to device 256 on chip 255.

Apparatus 250 also operates in the reverse direction, so that light from device 256 directed up towards surface 265 will be reflected into the core 261 of fiber 260.

One of the limitations of fiber to chip coupler 250 is the somewhat large distance between the core 261 of fiber 260 and device 256 on chip 255 resulting in a relatively large insertion loss for coupler 250.

Improved fiber to chip couplers using cut fibers positioned on the surface of a device are described in U.S. patent application Ser. No. 10/779,040, filed on Mar. 11, 2004 and entitled: "Fiber to Chip Coupler", which is incorporated herein by reference.

Figure 3:
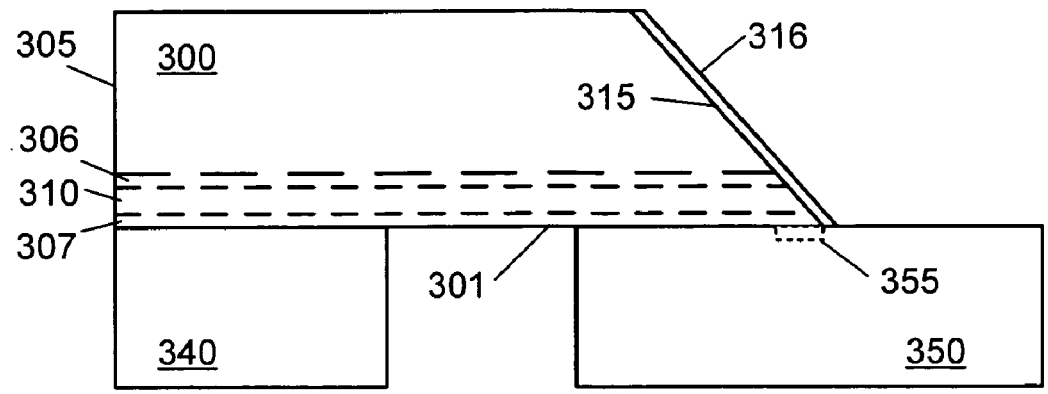
FIG. 3 is a side view of a planar lightwave circuit (PLC) device for connecting optical fibers to the top of an optical or optoelectronic device or integrated circuit, according to one embodiment of the present invention.

FIG. 3 is a side view, not to scale, of planar lightwave circuit (PLC) device 300 for connecting optical fibers to the top of an optical or optoelectronic device or integrated circuit 350, according to one embodiment of the present invention. As used within the context of the present patent application, "device" herein refers to: an optical or optoelectronic integrated circuit or to an optical or optoelectronic device.

PLC 300 provides a connection between an optical fiber (not shown in FIG. 3) and an optical component 355 on the surface of optical device 350. PLC 300 is positioned on top of optical device 350 and support block 340. PLC 300 is attached to device 350 and support block 340 by a thin layer of adhesive. As used within the context of the present patent application, "component" herein refers to: an optical or optoelectronic component, which is part of an optical or optoelectronic integrated circuit or is part of an optical or optoelectronic device.

The layer of adhesive can be any of a variety of adhesive materials, such as: an adhesive, an epoxy, solder or glass frit. PLC 300 has at least three surfaces: planar bottom side or base 301, left side 305 and planar angled reflective side 315. Surface 305 is preferably flat, but can in some applications be fabricated as a curved surface. Reflective coating 316 coats angled side 315. Various types of fibers, such as SMF, PMF or MMF, can be coupled to device 350 using PLC 300.

Reflective coating 316 can be made of a single layer or multiple layers. A single layer coating 316 can be made of materials such as: metal, dielectric or adhesive. A multilayer coating 316 can be made of several layers of metal, dielectric or adhesive. Various metals such as aluminum, nickel, chromium and gold can be used as a layer of coating 316. Reflective coating 316 can be designed and fabricated as a wavelength selective coating, so that only certain wavelengths of light are reflected at surface 315. Surface 315 and coating 316 are preferably smooth surfaces to maximize the reflection of light at surface 315.

Total internal reflection of light can occur at an uncoated surface 315, if the refractive index of PLC 300 is considerably higher than the refractive index of the air next to surface 315. Similarly, if surface 315 of PLC 300 is next to a medium other than air, then total internal reflection can occur at uncoated surface 315, if the refractive index of PLC 300 is considerably higher than the refractive index of the medium next to surface 315.

PLC 300 includes optical waveguide 310 surrounded by cladding layers. Waveguide 310 extends from surface 305 to the angled reflective surface 315 of PLC 300. Waveguide 310, as shown in FIG. 3, is a waveguide that is parallel to bottom surface 301 and as close as possible to the bottom surface or base 301. The two ends of waveguide 310 at surface 305 and at angled reflective surface 315 are two bidirectional input/output optical ports for waveguide 310.

In other embodiments, PLC 300 can be fabricated with many optical waveguides similar to waveguide 310 and with the same optical port configuration: with one port at surface 305 and another port at angled reflective surface 315.

A light beam propagating through waveguide 310 towards angled reflective surface 315 is reflected down to optical component 355 on device 350. The light beam passes through bottom surface 301 of PLC 300, a thin layer of adhesive 330, top surface 351 and to component 355 of device 350. As is well known to those skilled in the art, the layers of adhesive between PLC 300 and device 350 should be uniform in thickness and have a refractive index that is equal or close to the refractive index of the bottom later of PLC 300 and the top layer of device 350. Before permanently fastening PLC 300 to optical device 350, the right hand port of waveguide 310 has to be optically aligned with optical component 355. Various optical alignment methods can be used, including a technique known as active alignment, and these methods are well known to those skilled in the art.

PLC 300 also operates in the reverse direction, such as when a light beam propagates upward from component 355 and is reflected by angled reflective surface 315 into waveguide 310, and then the light beam propagates toward the opposite end of waveguide 310 and towards surface 305.

Optical device 350 can have many devices or components on it, but in FIG. 3 only exemplary component 355 is shown. Component 355 can be any of a variety of optical or optoelectronic components, such as light sources, modulators or receivers. Light sources, such as a grating coupler or a laser on device 350 can direct a light beam off device 350, and into waveguide 310 on PLC 300. Light receivers on device 350 can receive a light beam from PLC 300 and can for example, include a grating coupler or a photodetector.

Waveguide 310 of PLC 300 can be designed to match the cross sectional dimensions of an optical fiber edge coupled to waveguide 310 at surface 305. A light beam in waveguide 310 can be coupled to optical component 355 on device 350, and if component 355 is a grating coupler, the grating coupler can provide a coupling of the light beam to, for example, a submicron integrated waveguide on device 350. A suitably designed grating coupler can match the size of an optical mode propagating in waveguide 310. Grating couplers that can provide a transition in cross sectional area for a light beam are described in U.S. patent application No. 60/446,842 entitled "Optical Waveguide Grating Coupler" filed on Feb. 11, 2003, which is incorporated herein by reference.

A particularly advantageous aspect of the present invention is that PLC 300 can connect light from an optical fiber to devices on the top of device 350, where the fiber is edge coupled to surface 305 of PLC 300.

Another advantage of the present invention is the short distance between the point of reflection on surface 315 and optical device 350, resulting in reduced insertion loss. The relatively short travel distance means that there is less divergence and distortion of light 320 (shown in FIG. 4), especially as compared to an optical fiber cut at an angle and placed on top of device 350. Waveguide 310 is separated from the bottom surface 301 of PLC 300 by a relatively thin layer of cladding as compared to the much larger distance from the core of an optical fiber through its relatively thicker cladding.

A typical SMF fiber has a diameter of 125 microns with a core of 9 microns. A light beam reflected from the diagonally cut end of a standard SMF fiber placed on its side on top of an optical device, has to travel a distance of at least 63 microns from the center of the core of the fiber to reach the surface of an optical device. Light beam 320 reflected down from the center of waveguide 310 by surface 315, could, for example, travel a distance as short as 20 microns, resulting in much lower coupling loss as compared to a cut fiber placed on a device. A coupling made using a cut fiber on a device will experience much more insertion loss as compared to PLC 300 used as a connector between an optical fiber and an optical device.

PLC 300 also has the advantage of providing a mode size match between an optical mode propagating through an optical fiber and the mode size at the input of a grating coupler on the surface of an optical device.

Figure 4:
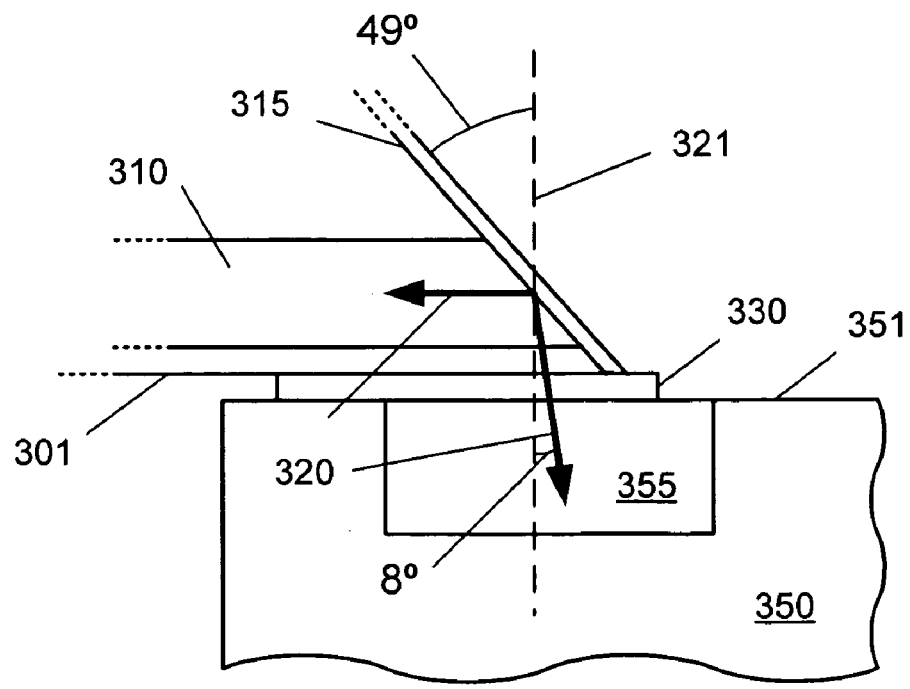
FIG. 4 is a diagram of the bidirectional path of light reflected by an angled reflective surface of a PLC, according to an embodiment of the present invention.

FIG. 4 is a partial cross sectional diagram, not to scale, of the path of light reflected by angled reflective surface 315 of PLC 300 shown in FIG. 3, according to one embodiment of the present invention. FIG. 4 is an expanded cross sectional side view of the right hand port of waveguide 310 shown in FIG. 3. Light beam 320 propagating down waveguide 310 towards angled reflective surface 315 is reflected down through adhesive layer 330 and towards optical device 350. As discussed above with respect to PLC 300 in FIG. 3, PLC 300 also operates in the reverse direction, when light beam 320 is directed up from device 350 through adhesive layer 330 and into PLC 300 and light beam 320 is reflected off of surface 315 into waveguide 310.

Angled reflective surface 315 is at an acute angle with respect to the base 301 of PLC 300. This acute angle determines the angle at which light 320 traverses through surfaces 301 and 351 and into device 350. Surfaces 301 and 351 are typically parallel or substantially parallel planes. The angle of surface 315 relative to base 301 can be selected by those skilled in the art, in order to provide a useable angle for light beam 320 going through surfaces 301 and 351. If surface 315 is at a 45° angle with respect to base 301, then light beam 320 will be perpendicular to surfaces 301 and 351.

As shown in FIG. 4, if angled reflective surface 315 is at an acute angle, such as the exemplary 49° angle with respect to surface 301, light beam 320 will be directed down to device 350 at an 8° angle with respect to the normal to the surfaces 301 and 351. When light beam 320 passes down through surfaces 301 and 351 at a relatively small acute angle, then the unwanted reflection of light beam 320 by surfaces 301 and 351 back to its source is substantially reduced.

When light beam 320 is directed up from device 350 to PLC 300 and towards angled reflective surface 315 within the area of the right hand port of waveguide 310, then light beam 320 is reflected by surface 315 into waveguide 310. When light beam 320 is directed up from device 350 at an acute angle, such as the exemplary 8° angle shown in FIG. 4, with respect to the normal 321, towards angled reflective surface 315 of PLC 300, light beam 320 is reflected by surface 315 into waveguide 310, and the unwanted reflections of light beam 320 by surfaces 351 and 301 back to its source is reduced. Light beam 320 then propagates down waveguide 310 towards surface 305.

Figure 5:
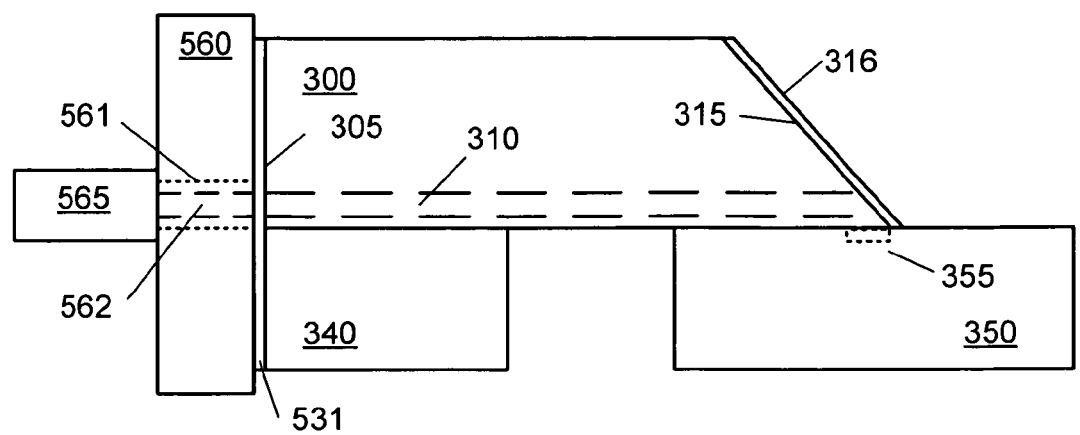
FIG. 5 is a side view of a PLC with an attached ferrule for connecting optical fibers to the top of an optical or optoelectronic device or integrated circuit, according to another embodiment of the present invention.
Figure 6:
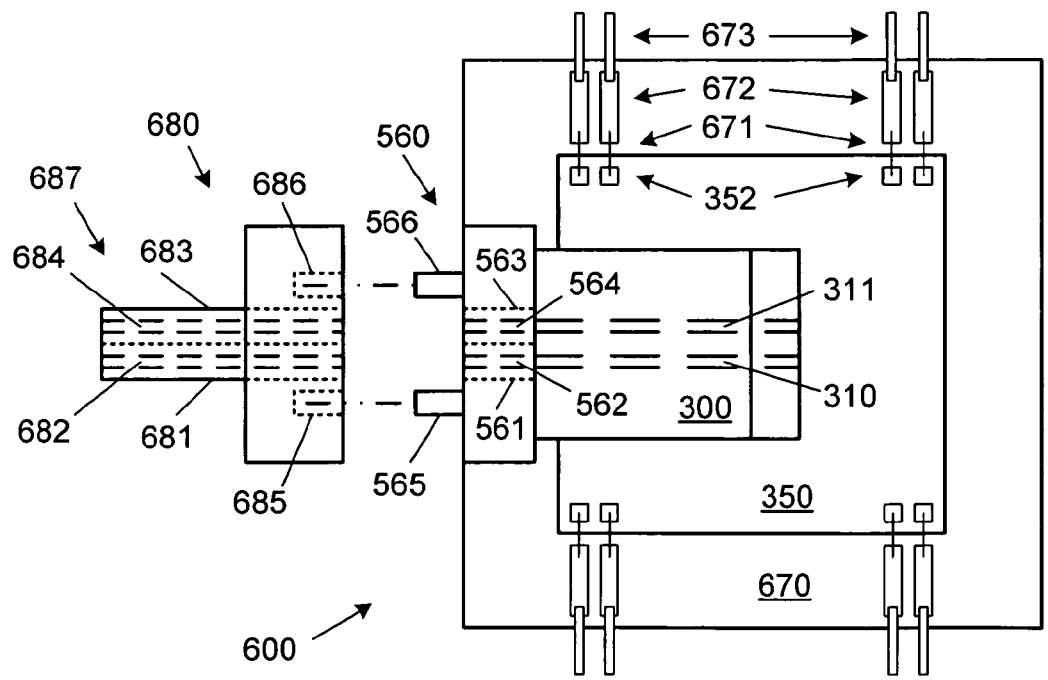
FIG. 6 is a top view of a package and connector assembly for connecting fiber optic cable to the top of an optical or optoelectronic device or integrated circuit, according to one embodiment of the present invention.

FIG. 5 is a side view, not to scale, of PLC 300 with an attached ferrule 560 for connecting optical fibers to the top of optical or optoelectronic device 350, according to another embodiment of the present invention. Ferrule 560 is attached to PLC 300 and support block 340 by adhesive layer 531. Ferrule 560 includes fiber stubs 561 and guide pins 565 and 566, and is typically attached with adhesive to PLC 300. Fiber stub 561 includes optical fiber core 562. Since FIG. 5 is a side view, guide pin 566 is not visible in FIG. 5. Guide pins 565 and 566 are used as alignment pins to mate with similarly sized alignment holes in a connector assembly, an example of which is shown in FIG. 6. Only one fiber stub 561 is visible in FIG. 5, but in other embodiments, there can be as many as a dozen, or as many as can physically be accommodated given the space available. Fiber stub 561 provides an optical path between waveguide 310 of PLC 300 and an external optical fiber held by a connector assembly. A connector assembly is not shown in FIG. 5, but a connector assembly, which is compatible with ferrule 560, can hold an optical fiber, several optical fibers, a fiber ribbon cable, a fiber array or some other arrangement of optical fibers.

The end surface 305 of PLC 300 and the corresponding end surface of support block 340 are in the same plane and are preferably not perpendicular to the optical path through fiber stub 561 and waveguide 310, in order to minimize the reflection of light at surface 305. The surface 305 could, for example, have an angle of 8° with respect to the perpendicular to the optical path through the center of waveguide 310. In other embodiments, surface 305 can be perpendicular to the optical path through fiber stub 561 and waveguide 310. The shape of surface 305 is preferably planar, but can in other embodiments, have a curved or angled shape, with a profile to match a similarly shaped surface on ferrule 560.

If a connector assembly with an optical fiber is plugged into ferrule 560, and a light beam propagates down the optical fiber towards PLC 300, it will travel through fiber stub 561, waveguide 310, reflect off surface 315 and arrive at component 355 on device 350. The same optical path is followed in the reverse direction, if a light beam is directed up from component 355 on device 350 to PLC 300, and through to ferrule 560.

FIG. 6 is a top view, not to scale, of package 600 and connector assembly 680 for connecting fiber optic cable 687 to the top of an optical or optoelectronic device 350, according to one embodiment of the present invention. Package 600 is similar to standard CQFP (ceramic quad flatpack) packages. Package 600 includes base 670, ferrule 560, optoelectronic device 350 and PLC 300. The cover to package 600 is not shown in FIG. 6. Connector assembly 680 mates with ferrule 560. A portion of the bottom of PLC 300 is attached with adhesive to optical device 350, which is supported by package base 670. Connector assembly 680 can accommodate a variety of optical fiber configurations, such as: an optical fiber, several optical fibers, a fiber ribbon cable, a fiber array or some other arrangement of optical fibers. Package 600 can include a support block under a portion of PLC 300, similar to support block 340, shown in FIGS. 3 and 5.

Package 600 is an example of a package for providing electrical connections between device 350 and external connections. Package 600 includes base 670, which is connected to device 350 by bonding wires 671. Base 670 includes bonding pads 672 and electrical leads 673. Many other electrical interconnection and package configurations are possible and well known to those skilled in the art. The electrical terminals or contacts 352 on device 350 can be any one of various well known types, such as: pads, bumps, solder balls and others that can be used for making electrical connections to a device or integrated circuit.

Package base 670 is one example of a means of electrical interconnection between device 350 and external electrical connections.

Package base 670 includes wire bonding pads 672 and electrical leads 673. Bonding wires 671 provide electrical connections between device 350 and base 670. Wires 671 are attached between device pads 352 and base pads 672. Electrical leads 673 on package 600 can be attached to a printed circuit board or connected to a socket. Only a few electrical connections to device 350 are shown in FIG. 6 in order to simplify the drawing. As can be seen from FIG. 6, base 670 can accommodate many more electrical connections to device 350 as may be needed by a particular device or integrated circuit 350.

FIG. 6 shows ferrule 560 with guide or alignment pins 565 and 566 and fiber stubs 561 and 563. Fiber stubs 561 and 563 include respective optical fiber cores 562 and 564. Connector assembly 680 includes alignment holes 685 and 686 and cable 687. Connector assembly 680, cable 687 and ferrule 580 can accommodate multiple optical fibers. Guide pins 565 and 566 match with respective alignment holes 685 and 686. Cable 687 includes optical fibers 681 and 683. Optical fibers 681 and 683 include respective optical fiber cores 682 and 684. When connector assembly 680 is mated to ferrule 560, there is a continuous bidirectional optical path between each of the optical fibers 681 and 683 to the top of device 350. A light beam propagating down fiber 681 into package 600 travels through fiber stub 561 and then from stub 561 through waveguide 310 and to device 350. Similarly, a light beam propagating down fiber 683 into package 600 travels through fiber stub 563, and then from stub 563 through waveguide 311 and to device 350. Light beams can also travel in the opposite direction from device 350 through waveguides 310 and 311 and then through ferrule 560 to fibers 681 and 683.

The polished ends of fibers 681 and 683 which connect to ferrule 560 and the corresponding polished ends of fiber stubs 561 and 563 are preferably not perpendicular to the optical path through the fibers 681 and 683 and the fiber stubs 561 and 563, in order to minimize the reflection of light at the polished ends. The polished ends could, for example, have an angle of 8° with respect to the perpendicular to the optical path through the fibers. In other embodiments, the polished ends of fibers 681 and 683 and the corresponding polished ends of fiber stubs 561 and 563 can be perpendicular to the optical path through the fibers 681 and 683 and the fiber stubs 561 and 563.

In alternate embodiments of the present invention, ferrule 560 can be configured with alignment holes and connector assembly 680 can be configured with alignment pins.

A particularly advantageous aspect of the present invention as shown by package 600 in FIG. 6 is that the package can be mechanically attached to a printed circuit board and wave soldering or other solder reflow methods can make all of the electrical connections from the package to the printed circuit board. An automated assembly process can use wave soldering or other solder reflow methods to make the electrical connections, and a fiber optic cable can be attached to the package after soldering. Attachment of package 600 using wave soldering or other solder reflow methods simplifies the manufacturing process and provides a low cost and reliable way of making the electrical connections.

Figure 7:
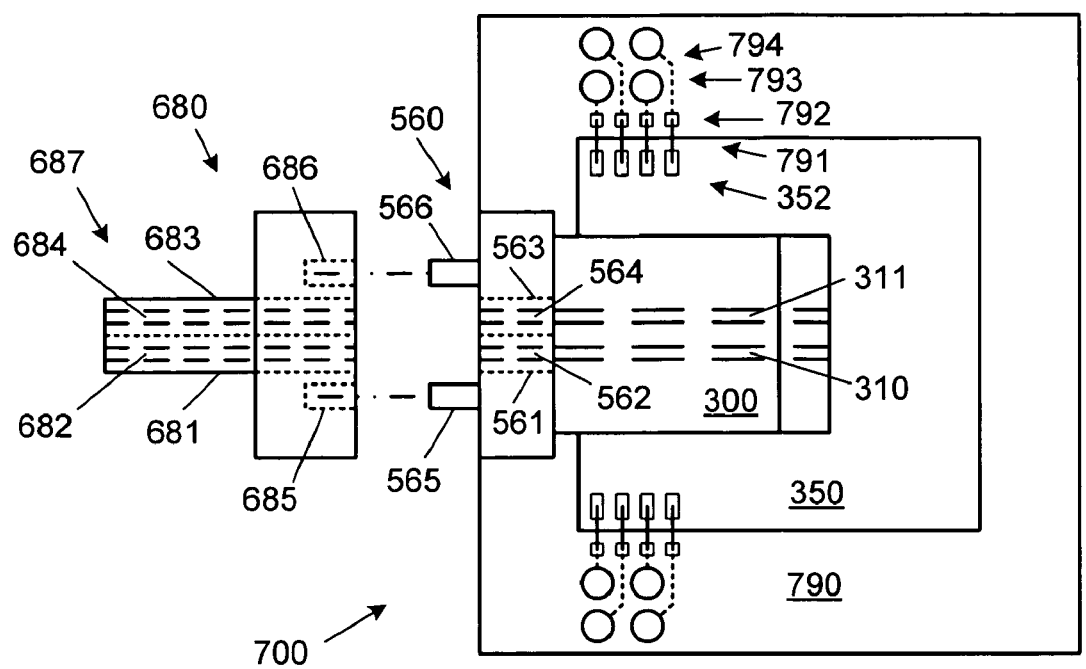
FIG. 7 is a top view of a package and connector assembly for connecting fiber optic cable to the top of an optical or optoelectronic device or integrated circuit, according to an alternate embodiment of the present invention.

FIG. 7 is a top view, not to scale, of package 700 and connector assembly 680 for connecting fiber optic cable 687 to the top of an optical or optoelectronic device or integrated circuit 350, according to an alternate embodiment of the present invention. Package 700 is similar to standard BGA (ball grid array) packages. Package 700 includes base 790, ferrule 560, device 350 and PLC 300. Base 790 can be a ceramic or polymer substrate, which are commonly used for such applications. Package 700 can include a support block under a portion of PLC 300, similar to support block 340, shown in FIGS. 3 and 5.

Package 700 is another example of a package for providing electrical connections between device 350 and external connections. Package 700 includes base 790, which is connected to device 350 by a group of bonding wires 791. Base 790 includes many bonding pads 792, conductors 793 and BGA contacts 794.

The components on device 350, which require electrical connections to off-chip signal paths and devices are connected to base 790 by each of the group of electrical bonding pads 352 and each of the group of bonding wires 791. BGA contacts on package 700 can be attached to a printed circuit board or connected to a socket.

Each of the BGA contacts 794 is connected to one or more of the bonding pads 352 on device 350 by one of the bonding wires 791, one of the bonding pads 792 and one of the conductors 793. Base 790 can be made of a single layer or multi-layer substrate. Conductors 793 can be copper or other metal conductive paths or traces, positioned on the top surface, the bottom surface or within an intermediate layer of base 790. Conductors 793 on a lower layer can be connected to each of their BGA contacts 794 by conductive vias. Each BGA contact on base 790 can be connected to one or more electrical bonding pads 352 on device 350 in a similar manner.

Only a few electrical connections to device 350 are shown in FIG. 7 in order to simplify the drawing. As can be seen from FIG. 7, base 790 can accommodate many more electrical connections to device 350 as may be needed by a particular optoelectronic device implemented using device 350.

The cover to package 700 is not shown in FIG. 7. Connector assembly 680 mates with ferrule 560, which is attached to PLC 300. A portion of the bottom of PLC 300 is attached to optical device 350, which is supported by package base 790. Connector assembly 680 can accommodate a variety of optical fiber configurations, such as: an optical fiber, several optical fibers, a fiber ribbon cable, a fiber array or some other arrangement of optical fibers.

The elements of FIG. 7, which are similarly numbered to the elements of FIG. 6, have the same features and provide the same functions as was discussed with respect to FIG. 6.

A particularly advantageous aspect of the present invention as shown by package 700 in FIG. 7 is that the package can be mechanically and electrically attached to a printed circuit board in an automated fashion prior to the connection of a fiber optic cable.

Figure 8:
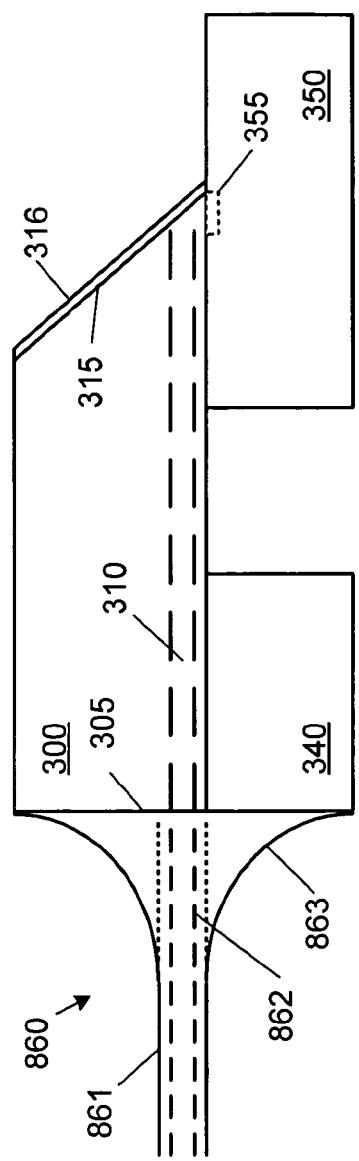
FIG. 8 is a side view of a PLC with an attached pigtail for connecting optical fibers to the top of an optical or optoelectronic device or integrated circuit, according to an alternate embodiment of the present invention.

FIG. 8 is a side view, not to scale, of PLC 300 with attached pigtail 860 for connecting optical fibers to the top of optical or optoelectronic device 350, according to an alternate embodiment of the present invention. Pigtail 860 includes adhesive 863 and fiber optic cable 861, of which one fiber is visible in FIG. 8. Pigtail 860 is typically attached to PLC 300 and support block 340 by adhesive 863. Fiber optic cable 861 includes fiber core 862, which couples to waveguide 310. Fiber optic cable 861 can be made of one or more optical fibers or a fiber ribbon. The other elements of FIG. 8 are the same as the similarly numbered elements of FIG. 3.

A particularly advantageous aspect of this embodiment of the present invention is the packaging of the pigtail and the connector together into one assembly for quick installation.

Figure 9:
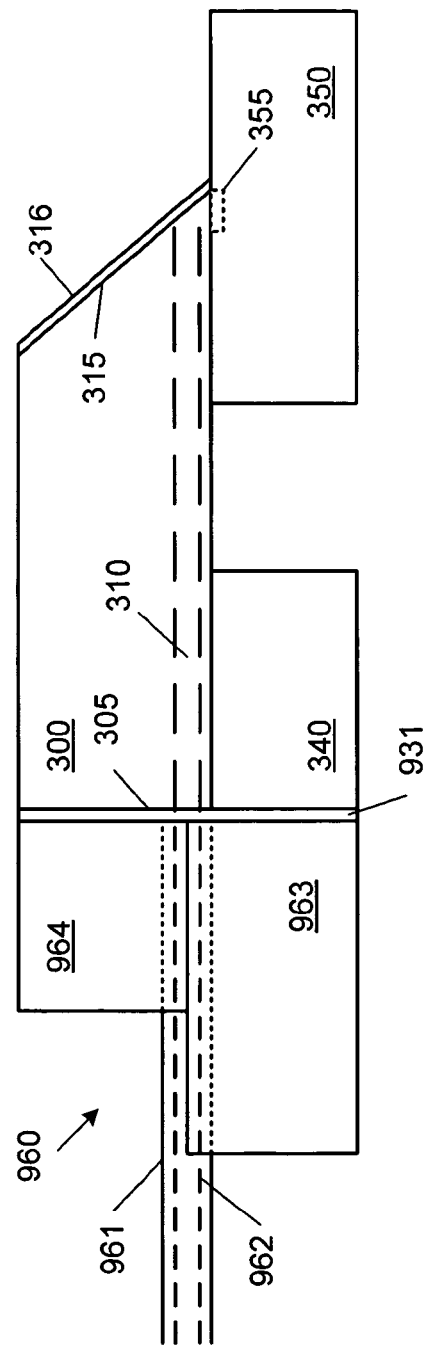
FIG. 9 is a side view of a PLC with an attached fiber array for connecting optical fibers to the top of an optical or optoelectronic device or integrated circuit, according to one other embodiment of the present invention.

FIG. 9 is a side view, not to scale, of PLC 300 with an attached fiber array 960 for connecting optical fibers to the top of an optical or optoelectronic device 350, according to one other embodiment of the present invention. Fiber array assembly 960 is made of pedestal 963, one or more optical fibers 961 and cover 964. Pedestal 963 has a v-groove for each optical fiber supported by pedestal 963 and the spacing of the v-grooves is designed to match the spacing of the waveguides in PLC 300. Cover 964 holds the fibers 961 in position and can be glued or mechanically attached to pedestal 963.

One optical fiber 961 is visible in FIG. 9. Optical fiber 961 includes fiber core 962, which couples to waveguide 310. Fiber array 960 is typically attached to PLC 300 and support block 340 by adhesive layer 931. Optical fibers 961 can each be made of SMF, MMF or PMF optical fibers. The other elements of FIG. 9 are the same as the similarly numbered elements of FIG. 3.

A particularly advantageous aspect of this embodiment of the present invention is the packaging of a fiber array and a connector together into one assembly for quick installation.

Figure 10:
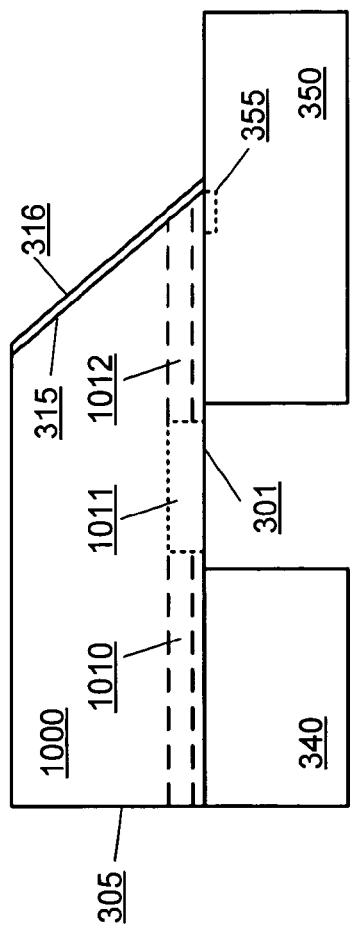
FIG. 10 is a side view of a PLC with an integrated optical device, for connecting optical fibers to the top of an optical or optoelectronic device or integrated circuit, according to another embodiment of the present invention.

FIG. 10 is a side view, not to scale, of PLC 1000 with integrated optical component 1011, for connecting optical fibers to the top of an optical or optoelectronic device 350, according to another embodiment of the present invention. PLC 1000 provides a connection between one or more optical fibers (not shown in FIG. 10) and at least one component, such as component 355 on the surface of optical device 350. PLC 1000 includes optical component 1011, which is connected to optical waveguides 1010 and 1012. Waveguide 1010 connects the optical port at surface 305 to component 1011. Waveguide 1012 connects component 1011 to the optical port at surface 315. The other elements of FIG. 10 are the same as the similarly numbered elements of FIG. 3.

PLC 1000 can include many optical components and optical waveguides where the optical waveguides are used to connect the internal optical components, such as 1011, to external optical fibers and to an optical device, such as 350 in FIG. 3 and also for interconnecting the internal optical components to each other. PLC 1000 can also include many optical waveguides for connecting external optical fibers to an optical or optoelectronic device or integrated circuit, such as device 350 in FIG. 3.

Waveguides 1010 and 1012, as shown in FIG. 10, are fabricated as waveguides that are parallel to bottom surface 301 and as close as possible to bottom surface or base 301. Component 1011 is shown as an optical component with two input/output ports, but component 1011 can have many such ports. PLC 1000 can also have many optical components, such as 1011, which can be interconnected by means of waveguides. Examples of optical components, which can be fabricated on PLC 1000, include, but are not limited to such components as: splitters, combiners, optical amplifiers, arrayed waveguide gratings and polarization splitting elements.

A particularly advantageous aspect of the present invention is the integration of optical components and waveguides in a PLC to connect optical fibers to the top of an optical or optoelectronic device or integrated circuit.

Figure 11:
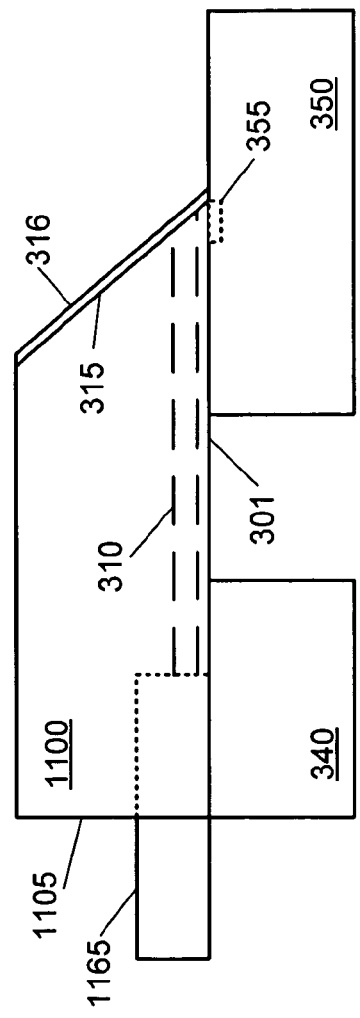
FIG. 11 is a side view of a PLC with integral guide pins for connecting optical fibers to the top of an optical or optoelectronic device or integrated circuit, according to an alternate embodiment of the present invention.

FIG. 11 is a side view, not to scale, of PLC 1100 with integral guide pins for connecting optical fibers to the top of an optical or optoelectronic device 350, according to an alternate embodiment of the present invention. PLC 1100 provides a connection between an optical fiber (not shown in FIG. 11) and at least one optical or optoelectronic component, such as component 355 on the surface of device 350. PLC 1100 includes guide or alignment pins 1165 and 1166, which are used to connect to a connector assembly, such as connector assembly 680 shown in FIG. 6. Guide pin 1166 is not visible in FIG. 11. PLC 1100 can also connect to modified versions of pigtail assembly 860 in FIG. 8 or fiber array assembly 960 of FIG. 9, where the modified assemblies include alignment holes to mate with the guide pins of PLC 1100. During the design of PLC 1100, the size and spacing of guide pins 1165 and 1166 can be selected to match the desired connector assembly to be used with PLC 1100. The openings needed to hold guide pins 1165 and 1166 in PLC 1100 can be formed using any of a variety of possible techniques, such as drilling, cutting v-grooves or other methods.

PLC 1100 is positioned on top of device 350 and support block 340. A portion of the bottom surface of PLC 1100 is attached to the top surface 351 of device 350 by adhesive. PLC 1100 has at least three surfaces: planar bottom side or base 301, left side 1105 and planar angled reflective side 315. Surface 1105 is preferably flat, but can in some applications be fabricated as a curved surface. Reflective coating 316 coats angled side 315. Various types of fibers, such as SMF, PMF or MMF, can be coupled to device 350 using PLC 1100.

Waveguide 310, as shown in FIG. 11, is a waveguide that is parallel to bottom surface 301 and as close as possible to the bottom surface or base 301. Waveguide 310 has one port at surface 1105 and the other port at angled reflective surface 315. Both of these ports are bidirectional input/output optical ports for waveguide 310. Multiple waveguides similar to waveguide 310 can be formed in PLC 1100. Other optical devices, such as component 1011 shown in FIG. 10, can also be included in PLC 1100.

The elements of FIG. 11, which are similarly numbered to the elements of FIG. 3, have the same features and provide the same functions 18 as was discussed with respect to FIG. 11.

In alternate embodiments of the present invention, PLC 1100 can be configured with alignment holes and a mating connector assembly, similar to connector assembly 680 shown in FIG. 6, can be configured with matching alignment pins.

A particularly advantageous aspect of the present invention is the use of guide pins or alignment holes integrated into the PLC, which can then be mated with a variety of connector assemblies.

Figure 12:
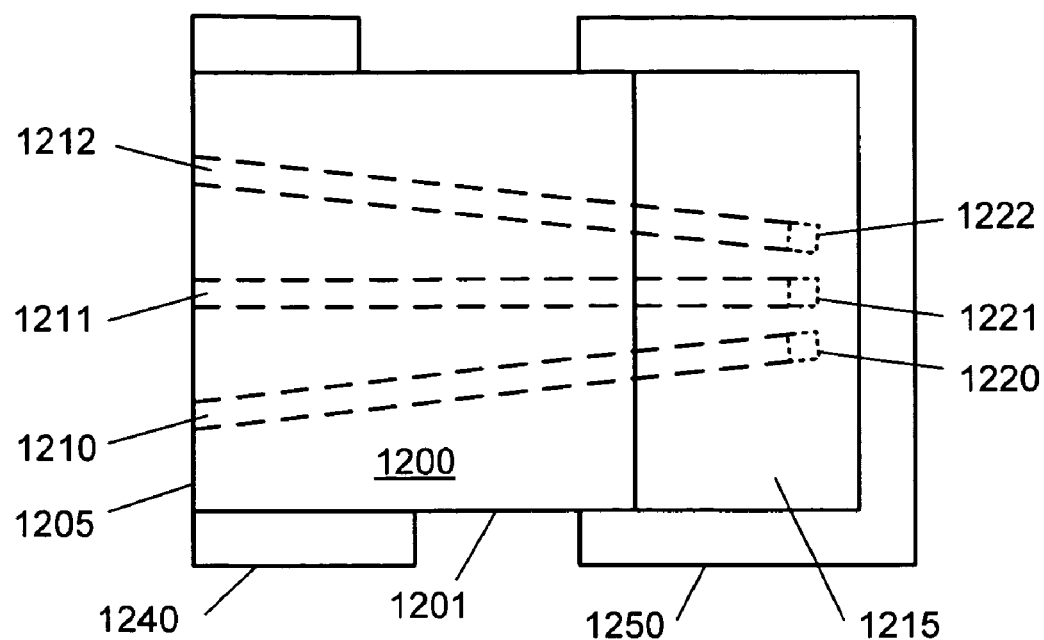
FIG. 12 is a top view of a PLC with a fan-in configuration for connecting optical fibers to the top of an optical or optoelectronic device or integrated circuit, according to another embodiment of the present invention.

FIG. 12 is a top view, not to scale, of PLC device 1200 for connecting optical fibers to the top of an optical or optoelectronic device or integrated circuit 1250, according to another embodiment of the present invention. PLC 1200 provides bidirectional optical connections between a plurality of optical fibers, not shown in FIG. 12, and optical components, not shown, on the surface of optical device 1250. PLC 1200 is positioned on top of optical device 1250 and support block 1240. PLC 1200 is attached to device 1250 and support block 1240 by a thin layer of adhesive. PLC 1200 has at least three surfaces: planar bottom side or base 1201, (which is underneath PLC 1200 in FIG. 12), left side 1205 and planar angled reflective surface 1215. Surface 1205 is preferably flat, but can in some applications be fabricated as a curved surface. A reflective coating, not shown, can coat angled side 1215. Various types of fibers, such as SMF, PMF or MMF, can be coupled to side 1205 of PLC 1200, using connector assemblies similar to those shown in FIGS. 5, 8 and 9.

PLC 1200 includes optical waveguides 1210, 1211 and 1212 surrounded by layers of cladding. Waveguides 1210, 1211 and 1212 extend from surface 1205 to angled reflective surface 1215 of PLC 1200. The waveguides in FIG. 12, are parallel to bottom surface 1201 and as close as possible to bottom surface or base 1201. Each of the two ends of the waveguides of FIG. 12 at surface 1205 and at angled reflective surface 1215 is a bidirectional input/output optical port for each waveguide. Light propagating from surface 1205 through waveguide 1210 will be reflected by angled surface 1215 down to a component, not shown, on device 1250. If waveguide 1210 has a square cross section, FIG. 12 shows an area of reflection 1220 at surface 1215. Similar areas of reflection 1221 and 1222 in FIG. 12 are for respective waveguides 1211 and 1212. In various embodiments, a waveguide in a PLC of the present invention can have one of many possible cross sectional shapes, such as a square, a rectangle, a trapezoid or other form.

As shown in FIG. 12, the spacing between the waveguides at surface 1205 is wider than the spacing at angled reflective surface 1215. Such an arrangement of waveguides provides a "fan-in" capability to PLC 1200, for light waves propagating from left to right in FIG. 12. Optical fibers, such as SMF have a typical minimum diameter of 125 microns, and a group or one-dimensional array of fibers cannot couple to components on a chip or device, which have a smaller center to center spacing.

PLC 1200 with its fan-in configuration is particularly advantageous in coupling a fiber array or a group of fibers to components on chip 1250, where the optical ports of the components on chip 1250 are separated apart from each other a smaller distance, than the spacing of the fibers connected to side 1205. For light propagating from right to left in FIG. 12, the waveguides are in a fan-out configuration.

In other embodiments of the PLC of the present invention, the spacing between the waveguides at surface 1205 can be wider than the spacing at angled reflective surface 1215. Such an arrangement of waveguides would provide a "fan-out" capability to such a PLC, for light propagating from left to right in FIG. 12. A PLC of the present invention, with such a fan-out configuration would be particularly advantageous in coupling a fiber array or group of fibers to components on chip 1250, where the optical ports of the components on chip 1250 are separated apart from each other a larger distance, than the spacing of the fibers connected to side 1205. In other embodiments, a PLC of the present invention can have a combination of waveguides providing both fan-in and fan-out configurations for light propagating from left to right.

Figure 13:
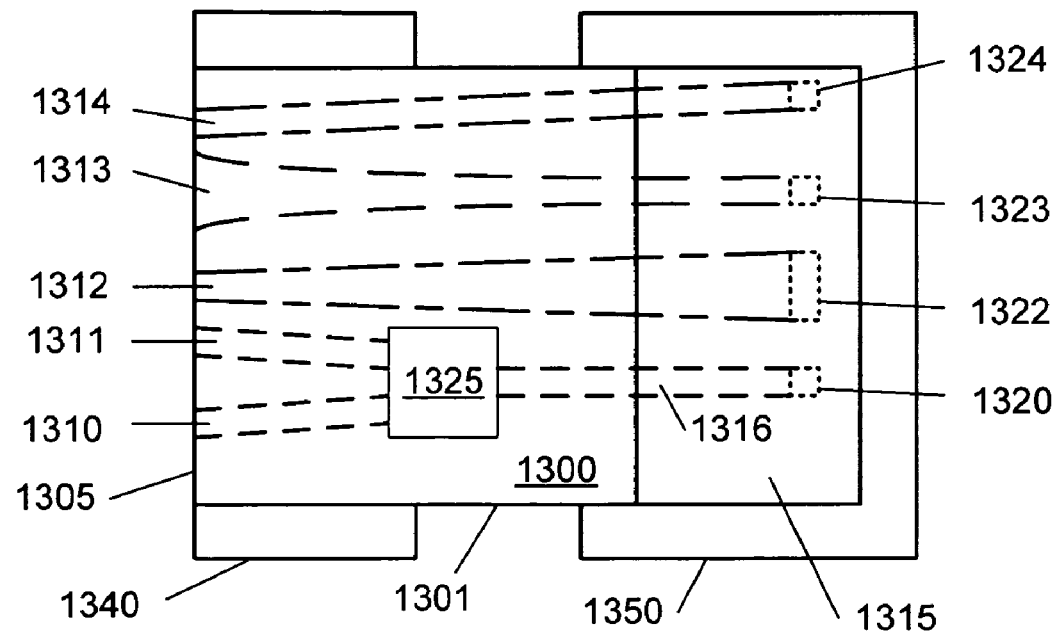
FIG. 13 is a top view of a PLC with [various types of optical waveguides] for connecting optical fibers to the top of an optical or optoelectronic device or integrated circuit, according to an alternate embodiment of the present invention.

FIG. 13 is a top view, not to scale, of PLC device 1300 with several types of optical waveguides for connecting optical fibers to the top of an optical or optoelectronic device or integrated circuit 1350, according to an alternate embodiment of the present invention. PLC 1300 provides bidirectional optical connections between several optical fibers, not shown in FIG. 13, and optical components, not shown, on the surface of optical device 1350. PLC 1300 is positioned on top of optical device 1350 and support block 1340. PLC 1300 is attached to device 1350 and support block 1340 by a thin layer of adhesive. PLC 1300 has at least three surfaces: planar bottom side or base 1301, (which is underneath PLC 1300 in FIG. 13), left side 1305 and planar angled reflective surface 1315. Surface 1305 is preferably flat, but can in some applications be fabricated as a curved surface. A reflective coating, not shown, can coat angled side 1315. Various types of fibers, such as SMF, PMF or MMF, can be coupled to side 1305 of PLC 1300, using connector assemblies similar to those shown in FIGS. 5, 8 and 9.

FIG. 13 include waveguides 1310, 1311, 1312, 1313, 1314 and 1316, which are surrounded by layers of cladding. Waveguides 1312, 1313 and 1314 extend from surface 1305 to angled reflective surface 1315 of PLC 1300. Waveguides 1310 and 1311 extend from surface 1305 to optical device 1325. Waveguide 1316 extends from device 1325 to angled surface 1315. The waveguides in FIG. 13, are parallel to bottom surface 1301 and as close as possible to bottom surface or base 1301. Each of the two ends of the waveguides of FIG. 13 at surface 1305 and at angled reflective surface 1315 is a bidirectional input/output optical port for each waveguide.

Waveguides 1313 and 1314 in FIG. 13 are in a "fan-out" type of configuration for light waves propagating from left to right, where the center to center distance between waveguides 1313 and 1314 at surface 1305 is less than the center to center distance between the waveguides at surface 1315. Waveguide 1313 is a tapered waveguide with elliptically shaped walls, which can modify the size and shape of an optical mode propagating through the waveguide. Light propagating from surface 1305 to angled surface 1315 through waveguide 1314 is reflected at area of reflection 1324. Light propagating from surface 1305 to angled surface 1315 through waveguide 1313 is reflected at area of reflection 1323.

Waveguide 1312 is a tapered waveguide extending from surface 1305 to angled surface 1315, which can modify the size and shape of an optical mode propagating through the waveguide. In other embodiments, a waveguide in a PLC of the present invention can be designed with a taper determined by a mathematical equation, such as an elliptical, hyperbolic, sinusoidal or other function.

Light propagating through waveguides 1312, 1313 and 1314 is reflected at respective areas of reflection 1322, 1323 and 1324.

Waveguides 1310 and 1311 extend from surface 1305 to optical device 1325 and waveguide 1316 extends from device 1325 to angled surface 1315. Waveguides 1310 and 1311 are in a fan-in configuration in FIG. 13 for light waves propagating from left to right towards device 1325 and in a fan-out configuration for light waves propagating from device 1325 towards surface 1305. Light propagating through waveguide 1316 is reflected at respective area of reflection 1320.

PLC 1300 with its fan-in, fan-out and optical mode shaping waveguide configurations is particularly advantageous in coupling a fiber array or group of fibers to components on chip 1350, where the optical ports of the components on chip 1350 have various port sizes and shapes and are separated apart from each with a variety of spacing distances.

As mentioned previously, the present invention has many particularly advantageous aspects, including that a PLC of the present invention provides a low loss connection, which can connect optical fibers to optical or optoelectronic devices on the top surface of an optical or optoelectronic device or integrated circuit. The short distance between the point of reflection on the angled reflective surface and the top of a device or integrated circuit makes low loss connections possible between the reflective surface of the PLC and an optical or optoelectronic device or integrated circuit. Also contributing to the low loss is the good mode size match between the waveguide in the PLC and a grating coupler on the device or integrated circuit. As mentioned previously, one advantage of the embodiment with the ferrule shown in FIGS. 5, 6 and 7 is the ease of manufacture due to the package being attached to a printed circuit board and soldered before the fiber optic cables are attached.

There are many other advantages to the present invention, such as: supporting high speed optical and electronic connections, high reliability, low cost compared to other solutions, compact design and high thermal conductivity of the package.

Although the present invention has been described in detail, it should be understood that various changes, substitutions and alterations can be made without departing from the spirit and scope of the invention.

We claim:

1. An apparatus comprising:
a plurality of optical waveguides disposed on a first substrate,
where the first substrate has at least three surfaces:
a first surface,
a planar base and
a planar angled reflective surface, and
the first surface is at an angle with respect to the base, and
the angled reflective surface is at an acute angle with respect to the base,
and
each of the plurality of optical waveguides:
is substantially parallel and substantially adjacent to the base of the first substrate and has first and second optical ports, and
the first optical port is located at the first surface, and the second optical port is located at the angled reflective surface;
and
a second substrate and a plurality of optical structures disposed on the second substrate, where the base of the first substrate is positioned on top of, substantially parallel, and substantially adjacent to the top surface of the second substrate, and
at least one of the plurality of optical structures on the second substrate is substantially optically aligned with the second optical port of at least one of the plurality of optical waveguides on the first substrate.

2. An apparatus according to claim 1, and further comprising a layer of adhesive, where the layer of adhesive is positioned between the base of the first substrate and the top of the second substrate.

3. An apparatus according to claim 1, and further comprising a layer of attachment material,
where the layer of attachment material is selected from one of the following: an organic epoxy, solder and glass frit.

4. An apparatus according to claim 2, wherein at least one of the plurality of optical structures on the second substrate comprises a grating coupler.

5. An apparatus comprising:
a plurality of optical waveguides disposed on a first substrate,
where the first substrate has at least three surfaces:
a first surface,
a planar base and
a planar angled reflective surface, and
the first surface is at an angle with respect to the base, and
the angled reflective surface is at an acute angle with respect to the base,
and
each of the plurality of optical waveguides:
is substantially parallel and substantially adjacent to the base of the first substrate and has first and second optical ports, and
the first optical port is located at the first surface, and the second optical port is located at the angled reflective surface;
and
a connector coupled to the first substrate, and the connector has a plurality of optical waveguides, where the connector optically couples each of the plurality of optical waveguides of the connector to the first optical port of each of the respective plurality of optical waveguides on the first substrate.

6. An apparatus according to claim 5, and further comprising a third substrate positioned under and adjacent to the first port of at least one waveguide of the plurality of optical waveguides of the first substrate.

7. An apparatus according to claim 5, wherein the connector comprises a multi-fiber ferrule,
where the multi-fiber ferrule is comprised of:
a ferrule,
a plurality of fiber stubs arranged in a spaced array and
a plurality of alignment pins.

8. An apparatus according to claim 7, and further comprising a connector assembly coupled to the multi-fiber ferrule,
where the connector assembly comprises:
a connector,
a fiber ribbon and
a plurality of alignment holes,
and
each of the fibers of the fiber ribbon is optically coupled to a respective one of the plurality of fiber stubs of the multi-fiber ferrule, and
each of the alignment holes of the connector assembly is coupled to a respective one of the alignment pins of the connector.

9. An apparatus according to claim 5, wherein the connector comprises a multi-fiber ferrule,
where the multi-fiber ferrule is comprised of:
a ferrule,
a plurality of fiber stubs arranged in a spaced array and
a plurality of alignment holes.

10. An apparatus according to claim 9, and further comprising a connector assembly coupled to the multi-fiber ferrule,
where the connector assembly comprises:
a connector,
a fiber ribbon and
a plurality of alignment pins,
and
each of the fibers of the fiber ribbon is optically coupled to a respective one of the plurality of fiber stubs of the multi-fiber ferrule, and
each of the alignment pins of the connector assembly is coupled to a respective one of the alignment holes of the connector.

11. An apparatus according to claim 5, wherein at least one optical waveguide of the connector is comprised of at least one optical fiber selected from a group comprising:
a single mode fiber, a polarization maintaining fiber, and
a multi-mode fiber.

12. An apparatus according to claim 5, and further comprising a layer of adhesive, where the layer of adhesive is positioned between:
the first surface of the first substrate and
the surface of the connector parallel and adjacent to the first surface of the first substrate.

13. An apparatus comprising:
a plurality of optical waveguides disposed on a first substrate,
where the first substrate has at least three surfaces:
a first surface,
a planar base and
a planar angled reflective surface, and
the first surface is at an angle with respect to the base, and
the angled reflective surface is at an acute angle with respect to the base,
and
each of the plurality of optical waveguides:
is substantially parallel and substantially adjacent to the base of the first substrate and has first and second optical ports, and
the first optical port is located at the first surface, and
the second optical port is located at the angled reflective surface;
and
a plurality of optical components disposed on the first substrate,
where each of the plurality of optical components has:
a plurality of optical ports,
at least a first optical waveguide is coupled between the first surface of the first substrate and the first optical port of the first optical component, and
at least a second optical waveguide is coupled between the second optical port of the first optical component and the angled reflective surface of the first substrate.

14. An apparatus according to claim 13, and further comprising at least a third optical waveguide coupled between a first optical port of a first optical component and a first port of a second optical component.

15. An apparatus according to claim 13, wherein at least one of the plurality of optical components is selected from a group comprising: a splitter, a combiner, an arrayed waveguide grating (AWG), a polarization splitting element and an optical amplifier.

16. An apparatus disposed on a first substrate comprising:
a plurality of optical waveguides and
a plurality of optical components,
where the first substrate has at least three surfaces:
a first surface,
a planar base and
a planar angled reflective surface, and
the first surface is at an angle with respect to the base, and
the angled reflective surface is at an acute angle with respect to the base, each of the plurality of optical waveguides:
has a plurality of optical ports and
is substantially parallel and substantially adjacent to the base of the first substrate, each of the plurality of optical components has a plurality of optical ports,
the first optical port of the first optical waveguide is located at the first surface, the second optical port of the first optical waveguide is coupled to a first optical port of a first optical component of the plurality of optical components,
the first optical port of the second optical waveguide is coupled to a second optical port of the first optical component of the plurality of optical components, and
the second optical port of the second optical waveguide is located at the angled reflective surface.

17. An apparatus according to claim 16, wherein light coupled to the first optical port of the second optical waveguide propagates longitudinally through the second optical waveguide and towards the second optical port of the second optical waveguide at the angled reflective surface, where the light is reflected by the angled reflective surface towards the base of the first substrate.

18. An apparatus according to claim 16, wherein the light reflected by the angled reflective surface propagates through the bottom surface of the first substrate,
where the direction of propagation is substantially normal to the base of the first substrate.

19. An apparatus according to claim 16, wherein the light reflected by the angled reflective surface propagates through the bottom surface of the first substrate,
where the direction of propagation is at an acute angle with respect to the normal to the base of the first substrate.

20. An apparatus according to claim 16, wherein the reflection of the light by the angled reflective surface is substantially total internal reflection.

21. An apparatus according to claim 16, wherein light propagates through the base of the first substrate and towards the second optical port of the second waveguide at the angled reflective surface,
where the light is reflected by the angled reflective surface into the second waveguide and propagates through the second waveguide towards the first optical port of the second waveguide.

22. An apparatus according to claim 21, wherein the light propagating through the base of the first substrate has a direction of propagation substantially normal to the base of the first substrate.

23. An apparatus according to claim 21, wherein the light propagating through the base of the first substrate has a direction of propagation at an acute angle with respect to the normal to the base of the first substrate.

24. An apparatus according to claim 21, wherein the reflection of the light by the angled reflective surface is substantially total internal reflection.

25. An apparatus according to claim 16, and further comprising a coating on the exterior of the angled reflective surface, where the coating is comprised of at least one layer selected from one of the following:
a dielectric, an adhesive and a metal.

26. An apparatus according to claim 25, wherein the coating comprises a wavelength selective coating.

27. An apparatus according to claim 16, wherein the surface of the angled reflective surface is substantially smooth.

28. An apparatus according to claim 16, and further comprising a second substrate and a plurality of optical structures disposed on the second substrate,
where the base of the first substrate is positioned on top of and substantially adjacent to the top surface of the second substrate, and
at least one of the plurality of optical structures on the second substrate is substantially optically aligned with the optical port located at the angled reflective surface of at least one of the plurality of optical waveguides on the first substrate.

29. An apparatus according to claim 28, and further comprising a layer of adhesive, where the layer of adhesive is positioned between the base of the first substrate and the top of the second substrate.

30. An apparatus according to claim 29, and further comprising a layer of attachment material,
where the layer of attachment material is selected from one of the following: an organic epoxy, solder and glass frit.

31. An apparatus according to claim 28, wherein at least one of the plurality of optical structures on the second substrate comprises a grating coupler.

32. An apparatus according to claim 16, and further comprising a connector coupled to the first substrate, and the connector has a plurality of optical waveguides,
where the connector optically couples each of the plurality of optical waveguides of the connector to the first optical port of each of the respective plurality of optical waveguides on the first substrate.

33. An apparatus according to claim 32, and further comprising a third substrate positioned under and adjacent to the first port of at least one waveguide of the plurality of optical waveguides of the first substrate.

34. An apparatus according to claim 32, wherein the connector comprises a multi-fiber ferrule,
where the multi-fiber ferrule is comprised of:
a ferrule,
a plurality of fiber stubs arranged in a spaced array and
a plurality of alignment pins.

35. An apparatus according to claim 34, and further comprising a connector assembly coupled to the multi-fiber ferrule,
where the connector assembly comprises:
a connector,
a fiber ribbon and
a plurality of alignment holes,
and
each of the fibers of the fiber ribbon is optically coupled to a respective one of the plurality of fiber stubs of the multi-fiber ferrule, and
each of the alignment holes of the connector assembly is coupled to a respective one of the alignment pins of the connector.

36. An apparatus according to claim 32, wherein the connector comprises a multi-fiber ferrule,
where the multi-fiber ferrule is comprised of:
a ferrule,
a plurality of fiber stubs arranged in a spaced array and
a plurality of alignment holes.

37. An apparatus according to claim 36, and further comprising a connector assembly coupled to the multi-fiber ferrule,
where the connector assembly comprises:
a connector,
a fiber ribbon and
a plurality of alignment pins,
and
each of the fibers of the fiber ribbon is optically coupled to a respective one of the plurality of fiber stubs of the multi-fiber ferrule, and
each of the alignment pins of the connector assembly is coupled to a respective one of the alignment holes of the connector.

38. An apparatus according to claim 32, wherein at least one optical waveguide of the connector is comprised of at least one optical fiber selected from a group comprising:
a single mode fiber,
a polarization maintaining fiber, and
a multi-mode fiber.

39. An apparatus according to claim 32, and further comprising a layer of adhesive, where the layer of adhesive is positioned between:
the first surface of the first substrate and
the surface of the connector adjacent to the first surface of the first substrate.

40. An apparatus according to claim 16, wherein the first surface comprises a planar surface.

41. An apparatus according to claim 16, and further comprising a third optical waveguide of the plurality of optical waveguides coupled between:
an optical port of a second optical component of the plurality of optical components and
an optical port of a third optical component of the plurality of optical components.

42. An apparatus according to claim 16, and further comprising a second plurality of optical waveguides,
where each of the second plurality of optical waveguides:
is substantially parallel and substantially adjacent to the base of the first substrate and
has first and second optical ports, and
the first optical port is located at the first surface, and the second optical port is located at the angled reflective surface.

43. An apparatus according to claim 16, wherein at least one of the plurality of optical components is selected from a group comprising: a splitter, a combiner, an arrayed waveguide grating (AWG), a polarization splitting element and an optical amplifier.

* * * * *